US009968105B2

(12) United States Patent
Mielnik et al.

(10) Patent No.: US 9,968,105 B2
(45) Date of Patent: May 15, 2018

(54) SYSTEM FOR DECONTAMINATING FOOD ARTICLES HAVING A POROUS OUTER SURFACE

(71) Applicant: STERIS Inc., Temecula, CA (US)

(72) Inventors: Thaddeus J. Mielnik, Concord, OH (US); Peter A. Burke, Concord, OH (US)

(73) Assignee: STERIS INC., Temecula, CA (US)

( * ) Notice: Subject to any disclaimer, the term of this patent is extended or adjusted under 35 U.S.C. 154(b) by 204 days.

(21) Appl. No.: 14/923,546

(22) Filed: Oct. 27, 2015

(65) Prior Publication Data

US 2017/0112156 A1    Apr. 27, 2017

(51) Int. Cl.
*A23B 5/10* (2006.01)
*A23B 5/005* (2006.01)

(52) U.S. Cl.
CPC .............. *A23B 5/10* (2013.01); *A23B 5/0052* (2013.01); *A23V 2002/00* (2013.01)

(58) Field of Classification Search
CPC ...... A23B 5/10; A23B 5/0052; A23V 2002/00
See application file for complete search history.

(56) References Cited

U.S. PATENT DOCUMENTS

| 2,655,449 | A | 10/1953 | Almquist | 99/113 |
|---|---|---|---|---|
| 3,144,342 | A | 8/1964 | Collier et al. | 99/161 |
| 5,535,667 | A | 7/1996 | Dalmasso et al. | 99/472 |
| 5,756,139 | A | 5/1998 | Harvey et al. | 426/298 |
| 6,692,784 | B2 | 2/2004 | Davidson | 426/298 |
| 7,011,739 | B2 | 3/2006 | Harkins et al. | 205/701 |
| 2002/0122753 | A1 | 9/2002 | Perlov et al. | 422/186.07 |
| 2004/0022907 | A1 | 2/2004 | Mielnik et al. | 426/320 |
| 2004/0052702 | A1* | 3/2004 | Shuman | A23L 3/003 422/208 |
| 2005/0031485 | A1 | 2/2005 | Wen | 422/28 |
| 2015/0327562 | A1* | 11/2015 | Zwijack | A23B 9/22 426/231 |
| 2017/0142991 | A1* | 5/2017 | Zwijack | A23B 9/22 |

OTHER PUBLICATIONS

International Search Report issued in corresponding International Patent Application No. PCT/US2016/041831, dated Sep. 19, 2016.

* cited by examiner

*Primary Examiner* — Anthony Weier
(74) *Attorney, Agent, or Firm* — Kusner & Jaffe; Michael A. Centanni

(57) ABSTRACT

A method for decontaminating articles having porous outer surfaces. The method includes steps of: providing a decontamination chamber; conveying the articles through the decontamination chamber at a predetermined speed wherein the speed is selected such that the articles are disposed in the decontamination chamber for a predetermined period of time; providing a source of sterilant vapor, the source providing the sterilant vapor at a temperature within a predetermined acceptable temperature range and at a concentration within a predetermined acceptable concentration range; conveying a sterilant vapor from the source of sterilant vapor to the decontamination chamber; and exposing the articles to the sterilant vapor. The predetermined period of time and the predetermined acceptable concentration range of the sterilant vapor are selected such that the sterilant vapor does not penetrate the porous outer surfaces of the articles.

7 Claims, 2 Drawing Sheets

SYSTEM FOR DECONTAMINATING FOOD ARTICLES HAVING A POROUS OUTER SURFACE

FIELD OF THE INVENTION

The present invention relates generally to the decontamination of articles, and more particularly, to a method and a system for supplying a sterilant vapor to decontaminate food articles having a porous outer surface.

BACKGROUND OF THE INVENTION

As background to the present invention, current decontamination systems for food articles having a porous outer surface (e.g., eggs, lobsters, etc.) require placing the articles within a water bath at an elevated temperature and then drying the articles to remove pathogens, such as *salmonella*. (The terms "decontamination" and "decontaminate" will be used hereinafter to refer to processes, such as disinfection, deactivation, sanitation, sterilization, etc., that are designed to kill microorganisms or pathogens.) If the pathogens remain on the surface of the article for an extended period of time (approximately two (2) hours) the pathogen may migrate through the porous outer surface of the article, thereby making the article a possible hazard for human consumption.

In addition to the foregoing, the temperature of the water bath must be carefully controlled to reduce the risk of partially cooking the food articles. A partially cooked food article would be undesirable to a consumer and may pose a health risk to the consumer. In addition, water baths for pasteurization are prone to potential contamination build-up as eggs are continuously processed.

The present invention provides a method and a system for decontaminating food articles having a porous outer surface. The present invention conveys the food articles through a decontamination chamber wherein the food articles are exposed to a sterilant vapor at a concentration sufficient to decontaminate the food articles and for a duration of time that is short enough so as to avoid undesirable side effects to the food articles.

SUMMARY OF THE INVENTION

In accordance with a preferred embodiment of the present invention, there is provided a method for decontaminating articles having porous outer surfaces. The method includes steps of: providing a decontamination chamber; conveying the articles through the decontamination chamber at a predetermined speed selected such that the articles are disposed in the decontamination chamber for a predetermined period of time; providing a source of sterilant vapor, the source providing the sterilant vapor at a temperature within a predetermined acceptable temperature range and at a concentration within a predetermined acceptable concentration range; conveying a sterilant vapor from the source of sterilant vapor to the decontamination chamber; and exposing the articles to the sterilant vapor. The predetermined period of time and the predetermined acceptable concentration range of the sterilant vapor are selected such that the sterilant vapor does not penetrate the porous outer surfaces of the articles.

In accordance with another preferred embodiment of the present invention, there is provided a system for decontaminating articles having porous outer surfaces. The system includes a decontamination chamber. A conveyor conveys the articles through the decontamination chamber. A source of sterilant vapor is provided. Conveying means conveys a sterilant vapor from the source of sterilant vapor to the decontamination chamber. A controller controls the conveyor and the source of sterilant vapor. The controller is programmed to: control the source of sterilant vapor to maintain the sterilant vapor within a predetermined acceptable concentration range and within a predetermined acceptable temperature range, and control the conveyor to convey the articles through the decontamination chamber at a predetermined speed wherein the predetermined speed is selected such that the articles are disposed in the decontamination chamber for a predetermined period of time. The predetermined period of time and the predetermined acceptable concentration range of the sterilant vapor are selected such that the sterilant vapor does not penetrate the porous outer surfaces of the articles so as to contact the food within.

An advantage of the present invention is a method and a system for providing a sterilant vapor at a sufficient concentration to quickly decontaminate food articles.

Another advantage of the present invention is a method and a system, as described above, wherein the duration of time that the food articles are exposed to the sterilant vapor is selected to hinder undesirable side effects to the food articles from an organoleptic perspective.

Yet another advantage of the present invention is a method and a system, as described above, wherein the duration of time that the food articles are exposed to the sterilant vapor is selected such that the sterilant vapor does not migrate through porous outer surfaces of the food articles.

Still another advantage of the present invention is a method and a system, as described above, wherein the porous surfaces of the food articles are decontaminated while continuously moving through an enclosed region.

Another advantage of the present invention is a method and a system, as described above, wherein the food articles move slightly during the decontamination process such that all surfaces of the food articles are exposed to the sterilant vapor.

These and other advantages will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

Figure 1:
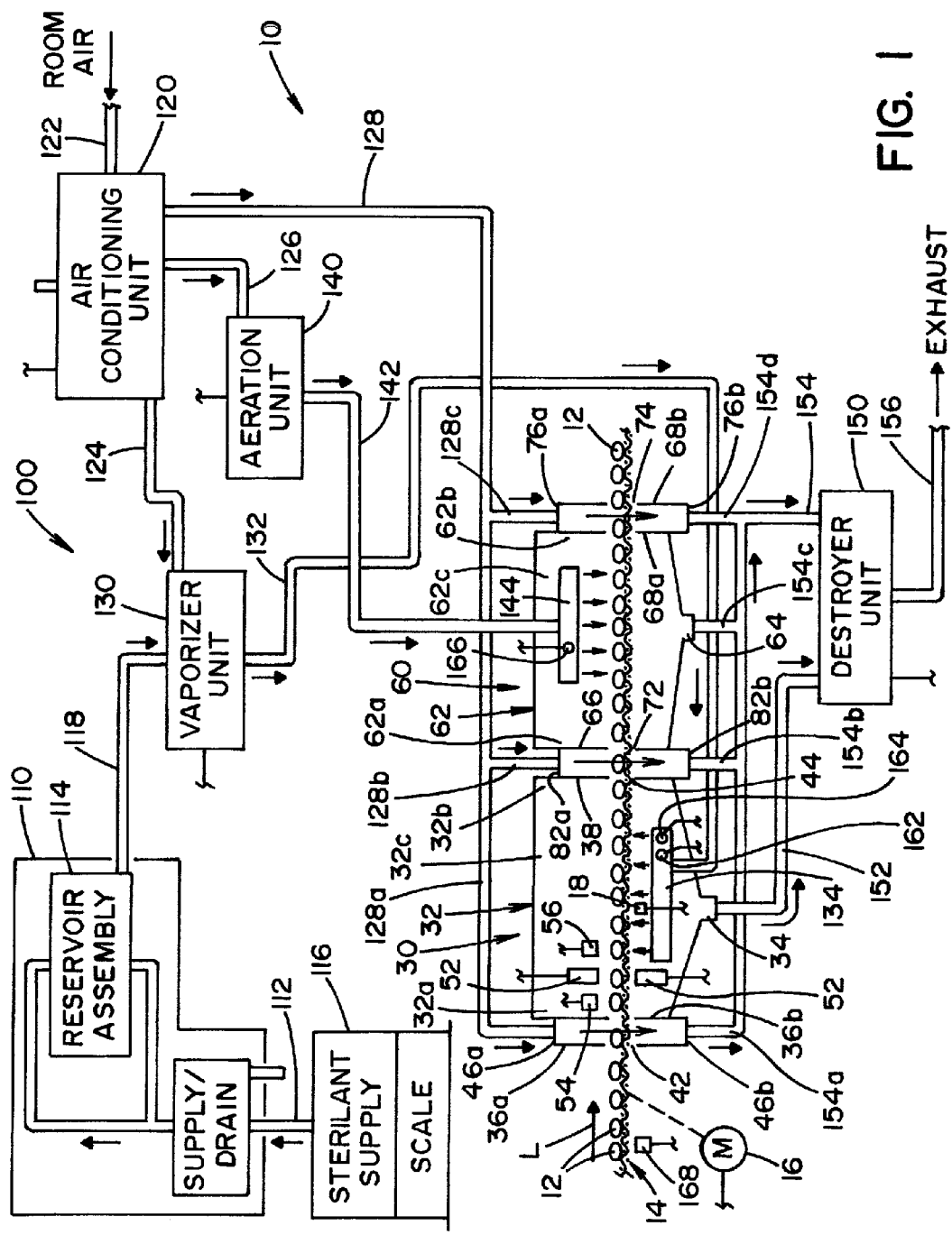
FIG. 1 is a drawing schematically illustrating a system for decontaminating articles moving along a processing line, illustrating a preferred embodiment of the present invention.

Referring now to the drawings wherein the showings are for the purpose of illustrating a preferred embodiment of the invention only, and not for the purpose of limiting the same, FIG. 1 shows a system 10 for decontaminating articles 12 moving along a processing line of system 10. System 10 will be described with respect to decontaminating food articles moving along a processing line in a food packaging facility. However, it is appreciated that the present invention may find advantageous application in other systems for supplying a sterilant vapor to a processing line having other articles moving therealong.

In general, system 10 (shown in FIG. 1) includes a conveyor 14, a decontamination chamber 30, an aeration chamber 60, a sterilant supply system 100 and a controller 160. Conveyor 14 represents a processing line of a facility. A motor 16 is provided for causing conveyor 14 to move articles 12 disposed thereon in a conveyance direction "L." In the embodiment shown, conveyor 14 includes a mesh surface for supporting articles 12 thereon. It is contemplated that an actuator 18 may be disposed proximate conveyor 14. In the embodiment shown, actuator 18 includes an arm (not shown). Actuator 18 may include a solenoid, an air piston or a similar device for causing movement of the arm of actuator 18. A distal end of the arm of actuator 18 is positioned to engage conveyor 14, as described in detail below.

Conveyor 14 extends through decontamination chamber 30 and aeration chamber 60. Decontamination chamber 30 includes an enclosure or housing 32 having an inlet end 32a, an outlet end 32b and defining an interior space or region 32c through which articles 12 are conveyed by conveyor 14 in conveyance direction "L." A bottom of housing 32 is trough-shaped and has an outlet port 34 formed at a lower portion thereof.

Housing 32 includes spaced-apart entrance walls 36a, 36b and an exit wall 38. An opening 42 extends through spaced-apart entrance walls 36a, 36b to define an inlet to interior space or region 32c. An opening 44 extends through exit wall 38 to define an outlet from interior space or region 32c. In the embodiment shown, spaced-apart entrance walls 36a, 36b are disposed generally parallel to each other and are joined by an upper wall 46a and a lower wall 46b.

A heating unit 52 is disposed in interior space or region 32c of housing 32 near inlet end 32a of housing 32. Heating unit 52 is provided for heating articles 12 moving through housing 32. In the embodiment shown, heater unit 52 includes two (2) units, one disposed above conveyor 14 and another one disposed below conveyor 14. As such, heating unit 52 is designed to uniformly heat articles 12 to a desired temperature.

A first temperature sensor 54 is disposed above conveyor 14 at a location on one side of heating unit 52 and a second temperature sensor 56 is disposed above conveyor 14 at a location on an opposite side of heating unit 52. In particular, first temperature sensor 54 is disposed between spaced-apart entrance walls 36a, 36b and heating unit 52. As shown in FIG. 1, articles 12 conveyed through decontamination chamber 30 in conveyance direction "L" move pass first temperature sensor 54, then heating unit 52 and then second temperature sensor 56. As such, first temperature sensor 54 provides a signal indicative of the temperature of articles 12 prior to heating unit 52 and second temperature sensor 56 provides a signal indicative of the temperature of articles 12 after heating unit 52. In the embodiment shown, first temperature sensor 54 and second temperature sensor 56 each are an infrared sensor for detecting the temperature of articles 12 without physically contacting articles 12.

Aeration chamber 60 includes an enclosure or housing 62 having an inlet end 62a, an outlet end 62b and defining an interior space or region 62c through which articles 12 are conveyed by conveyor 14 in conveyance direction "L." A bottom of housing 62 is trough-shaped and has an outlet port 64 formed at a lower portion thereof.

Housing 62 includes entrance wall 66 and spaced-apart exit walls 68a, 68b. An opening 72 extends through entrance wall 66 to define an inlet to interior space or region 62c. An opening 74 extends through spaced-apart exit walls 68a, 68b to define an outlet from interior space or region 62c. In the embodiment shown, spaced-apart exit walls 68a, 68b are disposed generally parallel to each other and are joined by an upper wall 76a and a lower wall 76b.

Decontamination chamber 30 is disposed adjacent to aeration chamber 60 such that exit wall 38 of housing 32 is disposed adjacent entrance wall 66 of housing 62. An upper wall 82a and a lower wall 82b connect exit wall 38 of housing 32 to entrance wall 66 of housing 62. In the embodiment shown, openings 42, 44 of housing 32 are generally aligned with openings 72, 74 of housing 62 such that conveyor 14 conveys articles 12 in a substantially straight line through decontamination chamber 30 and aeration chamber 60. It is contemplated that decontamination chamber 30 and aeration chamber 60 may be disposed in other configurations, e.g., circular, angled, etc., without taking from the present invention, so long as articles 12 are conveyed through both decontamination chamber 30 and aeration chamber 60.

Broadly stated, sterilant supply system 100 includes a liquid sterilant supply unit 110, an air conditioning unit 120, a vaporizer unit 130, an aeration unit 140 and a destroyer unit 150. The foregoing units are briefly described below. A detailed description of the foregoing units is provided in U.S. patent application Ser. No. 11/741,299, hereby incorporated herein by reference.

Liquid sterilant supply unit 110 conveys a liquid sterilant to vaporizer unit 130. A supply line 112 connects a reservoir assembly 114 of liquid sterilant supply unit 110 to an external supply 116 of liquid sterilant. A sterilant feed line 118 is connected at one end to reservoir assembly 114 and at another end to vaporizer unit 130. Reservoir assembly 114 provides continuous, uninterrupted flow of liquid sterilant to vaporizer unit 130. It is contemplated that the liquid sterilant may include sterilants, such as hydrogen peroxide or peracetic acid.

Air conditioning unit 120 conveys a clean, dry carrier gas (e.g., air) to vaporizer unit 130, aeration unit 140 and portions of housing 32 and housing 62, as described in detail below. Air conditioning unit 120 is provided to condition, i.e., to filter and to dry air used in vaporizer unit 130, aeration unit 140 and portions of housing 32 and housing 62.

Air conditioning unit 120 may include a filter (not shown) for removing debris from the air passing through air conditioning unit 120. Air conditioning unit 120 may also include a desiccant (not shown) for drying the air passing through air conditioning unit 120. An air inlet conduit 122 has a first end that communicates with the environment, namely room air, and another end that is connected to air conditioning unit 120. A first air supply line 124 is connected at one end to air conditioning unit 120 and at another end to vaporizer unit 130. A second air supply line 126 is connected at one end to air conditioning unit 120 and at another end to aeration unit 140. A third supply line 128 is connected at one end to air conditioning unit 120 and at another end to housing 32 and housing 62. In particular, one end of third supply line 128 divides into three (3) branches, i.e., a first branch 128a, a second branch 128b and a third branch 128c. First branch 128a connects to upper wall 46a. Second branch 78b connects to upper wall 82a. Third branch 128c connects to upper wall 76a. In this respect, first branch 128a conveys air to the space defined between spaced-apart entrance walls 36a, 36b. Second branch 128b conveys air to the space defined between exit wall 38 and entrance wall 66. Third branch 128c conveys air to the space defined between spaced-apart exit walls 68a, 68b.

Vaporizer unit 130 is connected to sterilant feed line 118 from liquid sterilant supply unit 110 and to first air supply line 124 from air conditioning unit 120. Vaporizer unit 130 may include a vaporizer (not shown) for vaporizing the liquid sterilant supplied by liquid sterilant supply unit 110. In the embodiment wherein the sterilant is hydrogen peroxide, the vaporizer may include a hot plate or an atomizing nozzle for vaporizing liquid hydrogen peroxide. It is contemplated that gaseous sterilants, such as $NO_2$ and ozone, may be used in combination with a liquid sterilant to decontaminate articles 12. It is also contemplated that only gaseous sterilants, such as $NO_2$ or ozone, may be used to decontaminate articles 12. In the embodiment wherein only a gaseous sterilant is used, the gaseous sterilant would be supplied to decontamination chamber 30 and liquid sterilant supply unit 110 and vaporizer unit 130 would not be needed.

Vaporizer unit 130 is connected to decontamination chamber 30 by conduit 132. A manifold 134 is mounted to an end of conduit 132. Manifold 134 is disposed within housing 32 of decontamination chamber 30 at a location below conveyor 14. Manifold 134 includes a plurality of spaced-apart openings or nozzles (not shown) that communicates with interior space or region 32c in housing 32 of decontamination chamber 30. The nozzles form jets of pressurized sterilant vapor that spray in a generally upward direction over articles 12 moving through decontamination chamber 30. It is contemplated that manifold 134 or additional manifolds (not shown) may be disposed in other positions relative to conveyor 14 (e.g., above or along a side of conveyor 14) for spraying sterilant vapor on articles 12 in other directions.

Aeration unit 140 is connected to second air supply line 126 from air conditioning unit 120. Second air supply line 126 from air conditioning unit 120 supplies filtered air to aeration unit 140. Aeration unit 140 may include a blower, a flow element, a pressure sensor, a temperature sensor, a filter, and a heater. The foregoing components are described in detail in U.S. patent application Ser. No. 11/741,299, hereby incorporated herein by reference.

An air supply conduit 142 connects aeration unit 140 to aeration chamber 60. A valve (not shown) may be disposed in air supply conduit 142 to control the flow of air along air supply conduit 142. A manifold 144 is connected to an end of air supply conduit 142. Manifold 144 is disposed in housing 62 of aeration chamber 60. Manifold 144 includes a plurality of nozzles or ports (not shown) to distribute filtered and heated air into aeration chamber 60. In the embodiment shown, manifold 142 is disposed above conveyor 14. Aeration unit 140 basically provides heated, filtered air to aeration chamber 60 to remove sterilant vapor from articles 12 on conveyor 14. It is contemplated that manifold 144 or additional manifolds (not shown) may be disposed in other positions relative to conveyor 14 (e.g., below or along a side of conveyor 14) for spraying heated, filtered air on articles 12 in other directions.

An exhaust conduit 152 connects outlet port 34 of enclosure or housing 32 of decontamination chamber 30 to destroyer unit 150. A second exhaust conduit 154 is connected at one end to destroyer unit 150. Another end of second exhaust conduit 154 divides into branch conduits 154a, 154b, 154c and 154d. Branch conduit 154a connects to lower wall 46b between spaced-apart entrance walls 36a, 36b. Branch conduit 154b connects to lower wall 82b between exit wall 38 and entrance wall 66. Branch conduit 154c connects to outlet port 64 of enclosure or housing 62. Branch conduit 154d connects to lower wall 76b between spaced-apart exit walls 68a, 68b.

An outlet conduit 156 fluidly connects destroyer unit 150 to a surrounding environment. Destroyer unit 150 includes a destroyer (not shown). The destroyer is basically a catalytic device that is operable to destroy a sterilant vapor flowing therethrough. In the embodiment wherein sterilant vapor is hydrogen peroxide vapor, the catalytic device converts the hydrogen peroxide vapor into water and oxygen.

According to the present invention, a plurality of sensors is associated with decontamination chamber 30 and aeration chamber 60. The plurality of sensors is connected to controller 160 (described in detail below) to provide signals indicative of the operation of system 10.

A temperature sensor 162 and a sterilant vapor sensor 164 are disposed in interior space or region 32c at a location proximate to conveyor 14. In the embodiment shown, temperature sensor 162 and sterilant vapor sensor 164 are disposed within manifold 134 in housing 32 of decontamination chamber 30. Temperature sensor 162 provides a signal indicative of the temperature of the sterilant vapor exiting manifold 134. Sterilant vapor sensor 164 provides a signal indicative of the concentration of sterilant vapor exiting manifold 134. In the embodiment wherein sterilant vapor is hydrogen peroxide vapor, sensor 164 is preferably a near infrared (IR) sensor.

A temperature sensor 166 is disposed in interior space or region 62c at a location proximate to conveyor 14. In the embodiment shown, temperature sensor 166 is disposed within manifold 144 in housing 62 of aeration chamber 60. Temperature sensor 166 provides a signal indicative of the temperature of the air exiting manifold 144.

A conveyor sensor 168 is disposed relative to conveyor 14. Conveyor sensor 168 provides a signal indicative of the movement of conveyor 14 through decontamination chamber 30 and aeration chamber 60. For example, conveyor sensor 168 may provide a signal indicative of the speed at which conveyor 14 is moving. It is contemplated that sensor 168 may be a conventionally known sensor, e.g., a proximity sensor, that is useful for detecting movement of conveyor 14.

Figure 2:
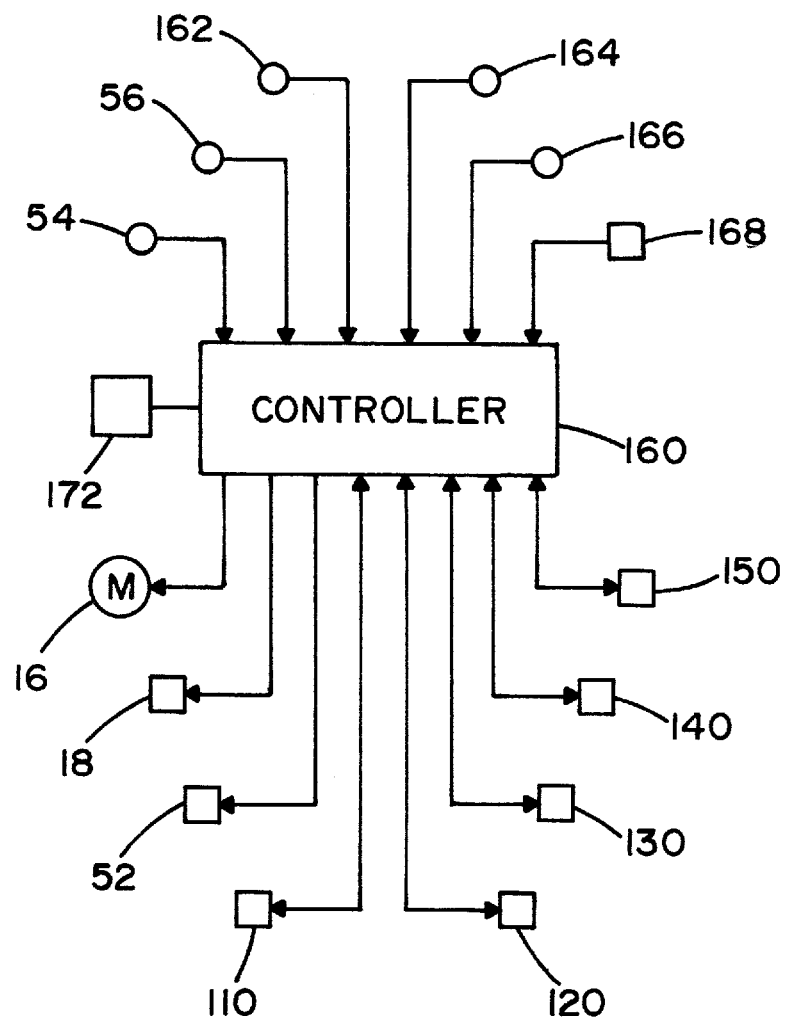
FIG. 2 is a schematic of a controller of the system shown in FIG. 1.

Controller 160 (shown in FIG. 2) may include a microprocessor, memory device(s) and a wireless communications interface. An input/output means 172 (e.g., an LED or LCD display) is connected to controller 160. Controller 160 is connected to motor 16, actuator 18, heating unit 52 and the various components of liquid sterilant supply unit 110, air conditioning unit 120, vaporizer unit 130, aeration unit 140 and destroyer 150 to allow controller 160 to control the operation thereof.

Controller 160 receives signals from the various sensors associated with system 10. In particular, controller 160 receives signals from sensors 54, 56, 162, 164, 166, 168 and the various sensors in liquid sterilant supply unit 110, air conditioning unit 120, vaporizer unit 130, aeration unit 140 and destroyer 150. Controller 160 is programmed to monitor continuously the signals from the aforementioned sensors in order to control the operation of system 10, as described below.

Referring now to the operation of the present invention, controller 160 is programmed to cause system 10 to operate such that articles 12 conveyed along conveyance direction "L" by conveyer 14 are decontaminated.

Prior to exposing articles 12 to a sterilant vapor, controller 160 controls system 10 in a conditioning phase of a decontamination cycle. During the conditioning phase, controller 160 controls system 10 such that air conditioning unit 120 conveys clean, dry air along third air supply line 128. The air then flows along first branch conduit 128a, second branch conduit 128b and third branch conduit 128c. The air exiting first branch conduit 128a flows in a downward direction between spaced-apart entrance walls 36a, 36b to branch conduit 154a connected to lower wall 46b. The air flowing between spaced-apart walls 36a, 36b forms a "curtain of air" to separate inlet end 32a from the surrounding environment. As such, the "curtain of air" prevents the air in decontamination chamber 30 from escaping to the surrounding environment and prevents the humidity and ambient air from the surrounding environment from entering decontamination chamber 30.

The air flowing along second branch conduit 128b from air conditioning unit 120 flows in a downward direction between exit wall 38 of housing 32 and entrance wall 66 of housing 62 to branch conduit 154b connected to lower wall 82b. The air flowing between exit wall 38 and entrance wall 66 forms a "curtain of air" that fluidly isolates outlet end 32b of housing 32 from inlet end 62a of housing 62.

The air flowing along third branch conduit 128c from air conditioning unit 120 flows in a downward direction between spaced-apart exit walls 68a, 68b to branch conduit 154d connected to lower wall 76b. The air flowing between spaced-apart exit walls 68a, 68b forms a "curtain of air" to separate outlet end 62b of housing 60 from the surrounding environment. The air flowing into branch conduits 154a, 154b and 154d from first branch conduit 128a, second branch conduit 128b and third branch conduit 128c, respectively, is then conveyed to destroyer unit 150.

After the aforementioned "curtains of air" are formed, controller 160 causes air conditioning unit 120 to convey dry, clean air to vaporizer unit 130 and to aeration unit 140. Controller 160 also causes liquid sterilant supply unit 110 to convey liquid sterilant to vaporizer unit 130. Controller 160 controls aeration unit 140 to maintain the temperature of the air conveyed to manifold 144 in aeration chamber 60 to within a predetermined acceptable temperature range, as measured by temperature sensor 166. Controller 160 controls vaporizer unit 130 to supply sterilant vapor to manifold 134 in decontamination chamber 30 at a temperature within a predetermined acceptable temperature range, as measured by temperature sensor 162, and at a concentration within a predetermined acceptable concentration range, as measure by sterilant vapor sensor 164. According to one embodiment of the present invention, the sterilant vapor is maintained at a concentration between about $1.0 \times 10^{-9}$ kg/L and about 0.01 kg/L and at a temperature between about 15° C. and about 90° C. According to another embodiment of the present invention, the sterilant vapor is maintained at a concentration between about $7.0 \times 10^{-4}$ kg/L and about $8.5 \times 10^{-3}$ kg/L.

The air exiting decontamination chamber 30 and aeration chamber 60 flows along exhaust conduit 152 and third branch conduit 154c, respectively, to destroyer unit 150. The sterilant vapor conveyed to destroyer unit 150 is destroyed and then exhausted into the surrounding environment through outlet conduit 156.

Controller 160 controls air conditioning unit 120 and destroyer unit 150 such that interior space or region 32c of housing 32 is maintained at a negative pressure. The negative pressure is selected to reduce the risk that harmful pathogens may escape from decontamination chamber 30 during the decontamination process. It is also contemplated that controller 160 may control air conditioning unit 120 and destroyer unit 150 such that interior space or region 32c of housing 32 is maintained at atmospheric pressure.

Once the temperature and concentration of sterilant vapor in manifold 134 and the temperature of air in manifold 144 are in the aforementioned predetermined acceptable ranges, controller 160 ceases the conditioning phase. Controller 160 then controls system 10 during a decontamination phase. During the decontamination phase, controller 160 energizes motor 16 to cause conveyor 14 to convey articles 12 through decontamination chamber 30 and through aeration chamber 60. After articles 12 pass through the curtain of air formed between spaced-apart entrance walls 36a, 36b, first temperature sensor 54 measures the temperature of articles 12. If the temperature of articles 12 is below a lower limit of a predetermined temperature range, controller 160 energizes heating unit 52 to heat articles 12 to a temperature that is within the predetermined temperature range. Second temperature sensor 56 measures the temperature of articles 12 after heating unit 52 to determine whether articles 12 have been heated to a temperature within the predetermined temperature range.

Controller 160 is programmed to adjust the power supplied to heating unit 52 and the speed of conveyor 14 to heat articles 12 to within the aforementioned predetermined temperature range. In this respect, controller 160 is programmed to increase the speed of conveyor 14 and/or decrease the power supplied to heating unit 52 if articles 12 are heated to a temperature that exceeds an upper limit of the aforementioned predetermined temperature range. Similarly, controller 160 is programmed to reduce the speed of conveyor 14 and/or increase the power supplied to heating unit 52 if articles 12 are not heated to a temperature that exceeds the lower limit of the aforementioned predetermined temperature range.

As can be appreciated, it may be necessary for system 10 to convey several articles 12 through decontamination chamber 30 until a steady state condition is reached wherein articles 12 are heated to a temperature within the predetermined temperature range. Articles 12 that are not heated to a temperature within the predetermined temperature range are discarded or returned to be reprocessed in system 10.

It is contemplated that the upper limit of the predetermined temperature range for articles 12 is about 90° C. In the embodiment of the present invention wherein articles 12 are eggs, controller 160 controls heating unit 52 to heat articles 12 to a temperature that is below about 60° C. The foregoing upper limit is selected to prevent the eggs from cooking or from causing other deleterious effects (e.g., coagulation).

It is also contemplated that the lower limit of the predetermined temperature range for articles 12 is a temperature that is greater than the temperature of the sterilant vapor exiting manifold 134. As such, the sterilant vapor exiting manifold 134 is prevented from condensing on articles 12. In the embodiment wherein articles 12 are eggs, condensation of sterilant on articles 12 increases the likelihood that sterilant may penetrate through the porous outer surface of the eggs. Due to the difficulty involved in removing sterilant that has penetrated through the outer surface of an egg and the harmful effects the sterilant may have on humans, it is desirable to prevent the sterilant from condensing on the eggs.

As articles 12 pass over manifold 134, actuator 18 repeatedly engages conveyor 14 such that articles 12 disposed thereon move slightly. The slight movement of articles 12 is designed to prevent any one portion of article 12 from remaining in contact with conveyor 14 during the entire decontamination phase. The slight movement of articles 12 allows a contact point between article 12 and conveyor 14 to change, thereby exposing the entire surfaces of articles 12 to the sterilant vapor.

It is also contemplated that the flow rate of air from manifold 134 may be selected such that articles 12 are slightly suspended above conveyor 14 on a "cushion of air." As such, no portion of articles 12 contacts conveyor 14 while being exposed to the sterilant vapor, thereby exposing the entire outer surfaces of articles 12 to the sterilant vapor.

Controller 160 also controls motor 16 such that the speed of conveyor 12, as measured by conveyor sensor 168, causes articles 12 to be disposed in decontamination chamber 30 for a predetermined period of time. The predetermined period of time is selected by the user to ensure that articles 12 are decontaminated while not allowing the sterilant vapor to penetrate through outer surfaces of articles 12. In the embodiment wherein articles 12 are eggs, the predetermined period of time is less than about thirty (30) seconds such that the sterilant vapor does not penetrate through the shell of the egg. The predetermined period of time and the predetermined concentration of sterilant vapor are selected to provide a 5 log reduction of pathogens, such as *salmonella*.

Conveyor 14 then transports articles 12 through the curtain of air disposed between decontamination chamber 30 and aeration chamber 60 and into interior space or region 62c of housing 62. Once in interior space or region 62c, articles 12 are exposed to a dry, clean air exiting manifold 144. The dry, clean air removes the sterilant vapor from articles 12. The air and the removed sterilant vapor exit interior space or region 62c through outlet port 64 along branch conduit 154c and are conveyed to destroyer 150.

It is contemplated that aeration chamber 60 may be connected to a source of a neutralizing agent. In the embodiment wherein the sterilant vapor is hydrogen peroxide vapor, the neutralizing agent neutralizes the hydrogen peroxide vapor on articles 12 so that articles 12 are safe for human consumption. The neutralizing agent may include sodium thiosulfate, sodium methyl sulfate, sodium metabisulfite or other reducing agents.

After articles 12 have remained in aeration chamber 60 for a user-defined period of time, conveyor 14 conveys articles 12 through the curtain of air formed between spaced-apart exit walls 68a, 68b. Articles 12 then exit system 10 for further processing, if desired.

The present invention, thus, provides a method and a system for decontaminating food articles having a porous outer surface. In particular, the present invention conveys the food articles through a decontamination chamber at a predetermined speed and exposes the food articles to a sterilant vapor having a predetermined concentration. The present invention exposes the food articles to the sterilant vapor for a predetermined period of time that is selected to prevent the sterilant vapor from penetrating the outer porous surfaces of the food articles. Moreover, the present invention causes the food articles to remain in motion or to be suspended above a conveyor during a decontamination phase such that the entire outer surfaces of the food articles are exposed to the sterilant vapor. Further still, the temperature of the sterilant vapor is selected to decontaminate the food articles while not causing undesirable side effects (e.g., partial cooking) to the food articles. In one embodiment of the present invention, the food articles are heated to a temperature that prevents the sterilant vapor from condensing on the porous outer surfaces of the food articles.

Methods and systems known heretofore tend to over-expose food articles to a sterilant vapor or overheat the food articles, thereby causing undesirable side effects, such as partially cooked food articles, or penetration of the sterilant vapor into the food articles. The present invention overcomes the foregoing problems and allows for efficient and quick decontamination of food articles, as compared to systems known heretofore.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A system for decontaminating articles having porous outer surfaces, said system comprised of:
    a decontamination chamber;
    a conveyor for conveying said articles through said decontamination chamber;
    a source of sterilant vapor;
    conveying means for conveying a sterilant vapor from said source of sterilant vapor to said decontamination chamber;
    a controller for controlling said conveyor and said source of sterilant vapor, said controller programmed to:
        control said source of sterilant vapor to maintain said sterilant vapor within a predetermined acceptable concentration range and within a predetermined acceptable temperature range; and
        control said conveyor to convey said articles through said decontamination chamber at a predetermined speed wherein said predetermined speed is selected such that said articles are disposed in said decontamination chamber for a predetermined period of time; and
    heating means for heating said articles wherein said controller is programmed to control said heating means to maintain said articles at a temperature greater than the temperature of said sterilant vapor and less than a maximum acceptable temperature of said articles,
    wherein said predetermined period of time and said predetermined acceptable concentration range of said sterilant vapor are selected such that said sterilant vapor does not penetrate said porous outer surfaces of said articles.

2. A system as defined in claim 1, wherein said articles are eggs.

3. A system as defined in claim 1, wherein said system further comprises:
    a first pair of spaced-apart walls disposed at an entrance end of said decontamination chamber;
    wherein a space defined between said spaced-apart walls defines a flow path for conveying pressurized air therealong, said pressurized air forming a curtain of air for separating an interior space of said decontamination chamber from a surrounding environment.

4. A system as defined in claim 1, wherein said conveyor includes a meshed surface.

5. A system as defined in claim 1, wherein said system further comprises:
    a manifold connected to said source of sterilant vapor, said manifold disposed below said conveyor for conveying said sterilant vapor in a generally upward direction over said articles disposed on said conveyor.

6. A system as defined in claim 1, wherein said sterilant vapor includes one or more of the following: hydrogen peroxide, ozone and peracetic acid.

7. A system for decontaminating articles having porous outer surfaces, said system comprised of:
- a decontamination chamber;
- a conveyor for conveying said articles through said decontamination chamber;
- a source of sterilant vapor;
- conveying means for conveying a sterilant vapor from said source of sterilant vapor to said decontamination chamber;
- a controller for controlling said conveyor and said source of sterilant vapor, said controller programmed to:
   - control said source of sterilant vapor to maintain said sterilant vapor within a predetermined acceptable concentration range and within a predetermined acceptable temperature range; and
   - control said conveyor to convey said articles through said decontamination chamber at a predetermined speed wherein said predetermined speed is selected such that said articles are disposed in said decontamination chamber for a predetermined period of time; and
- an actuator disposed in said decontamination chamber, said actuator positioned to engaged said conveyor to cause movement of said articles relative to said conveyor as said articles are conveyed through said decontamination chamber,
- wherein said predetermined period of time and said predetermined acceptable concentration range of said sterilant vapor are selected such that said sterilant vapor does not penetrate said porous outer surfaces of said articles.

* * * * *